United States Patent [19]

Beck et al.

[11] 4,415,811
[45] Nov. 15, 1983

[54] OPTICAL SCANNING APPARATUS

[75] Inventors: Jürgen Beck, Cologne; Herbert Röhrig, Berg-Gladbach, both of Fed. Rep. of Germany

[73] Assignee: Dr. Madaus & Co., Cologne, Fed. Rep. of Germany

[21] Appl. No.: 296,045

[22] Filed: Aug. 25, 1981

[30] Foreign Application Priority Data

Aug. 27, 1980 [DE] Fed. Rep. of Germany ....... 3032334

[51] Int. Cl.³ ...................... G01B 11/02; G01N 21/86
[52] U.S. Cl. ..................................... 250/560; 356/376
[58] Field of Search ................ 250/560, 216; 356/376, 356/392, 394, 430, 237

[56] References Cited

U.S. PATENT DOCUMENTS 4,349,278  9/1982  French et al. ....................... 356/384

Primary Examiner—David C. Nelms
Assistant Examiner—Darwin R. Hostetter
Attorney, Agent, or Firm—Felfe & Lynch

[57] ABSTRACT

An apparatus for the optical scanning of objects in which the light from at least one light source falls on at least one light-sensitive sensor and the objects to be scanned are disposed between the light source and the sensor. The sensor comprises a large-area solar cell and an aperture mask conforming to the contours of the object to be scanned disposed between the surface of the solar cell and the object to be scanned.

9 Claims, 2 Drawing Figures

OPTICAL SCANNING APPARATUS

BACKGROUND OF THE INVENTION

The invention relates to an apparatus for the optical scanning of objects wherein the light from one or more light sources falls on one or more light-sensitive sensors and the objects to be scanned are disposed between the light sources and the sensors.

Optical recognition of deviations from the desired structure during the production and packaging of a wide variety of products is a known practice. In this practice, light rays emanating from a light source are reflected, for example, by the object being scanned and impinge on photocells, secondary-electron multipliers or other recording means. Subsequent means serve to indicate the recognized deviations and, optionally, to actuate other means which eliminate the object recognized as defective from the production or packaging process. Prior-art apparatuses of this type have the drawback that they are of relatively complex and costly construction and utilize a great many individual components as sensors, so that in the case of small objects to be scanned, as in the inspection of tablets, for example, complicated and time-consuming repairs are necessary when an individual sensor element fails.

SUMMARY OF THE INVENTION

The object of the invention is to provide a simplified yet more reliable scanning apparatus of small overall height which requires no complicated electronics and/or optics and indicates defects of the objects more accurately and dependably.

This object is accomplished through an apparatus of the type outlined above which is characterized in that one or more large-area solar cells are used as light-sensitive sensor or sensors, and that an aperture mask conforming to the contours of the object to be scanned is disposed between the surface of the solar cells and the object to be scanned.

The light source is advantageously a diffuse radiator, a radiation shield adapted to the object to be scanned being disposed between said object and the radiator.

In a further, preferred embodiment, the radiation source is a light-emitting diode (LED) and/or an infrared light source.

Still another preferred embodiment involves an apparatus wherein a light souce produces one or more focused beams, which may be adapted to the number and contours of the objects. In this embodiment, one or more fiber-optic bundles may also be used as light source.

To secure higher sector resolution, it is advantageous to increase the number of solar cells in the area where higher resolution is desired, and to associate with each solar cell a separate amplifier.

The solar cells are preferably disposed on a carrier plate which, by means of springs resting on the lower part of the apparatus, is forced into fixed position against a glass plate supported on a guide.

One or more solar cells, along with the aperture mask conforming to the objects to be scanned and with the associated supporting and mounting elements, are advantageously combined into a bank.

The solar cell or cells transmit a voltage signal to an amplifier which actuates both a defect-indicating means and a machine-control system.

The apparatus in accordance with the invention is suited for the scanning inspection of tablets, capsules and dragées, which usually are packaged in thermoformed foils. It is suited just as well for the scanning inspection of many other objects, such as confectionery, metal articles, textiles and other goods which are of such nature that defects in their shape and structure can be detected with radiation of the type to which solar cells respond.

The large-area solar cells here involved are solar cells which, in contrast to the point-type radiation sensors heretofore employed for scanning purposes, cover at least the areas defined by the apertures in the aperture mask. This has the substantial advantage that defects in or on these relatively large-area objects can be detected through a single measured value, namely, a voltage change, whereas with prior-art apparatuses large areas must be broken down into a multitude of scanned points and electronically processed.

The scanning apparatus in accordance with the invention has the great advantage over prior-art apparatuses that, with it, objects of differing contours can also be inspected for defects simply by replacing the aperture mask and possibly the light shield.

Defects in the shape and structure of an object which can be detected in this way include faulty contours, defects in the thickness of layers if the residual layer is still permeable to radiation, and flaws due to inclusion of foreign bodies which reduce the permeability to radiation.

The effectiveness of the apparatus in accordance with the invention is not impaired when the tablets, capsules, dragées, etc., to be inspected are packaged in an opaque foil.

When the objects to be inspected are disposed in one plane, which is usually the case in the inspection of tablets, capsules, dragées, etc., the large-area solar cells of the inspection apparatus in accordance with the invention are preferably also arranged in one plane.

Solar-cell banks of the type to which the invention relates may also be combined with one another in such a way that they cover the contours of the objects to be inspected three-dimensionally. In other words, one solar-cell bank may be located under the object, another to the side of the object, and possibly still another to the rear of the object, with the planes of the solar-cell banks located to the side and to the rear of the object making an angle of about 90 degrees with the plane of the solar-cell bank located under the object and an angle of about 90 degrees with one another.

BRIEF DESCRIPTION OF THE DRAWINGS

The invention will now be described in greater detail with reference to the accompanying drawings, wherein.

DETAILED DESCRIPTION OF THE INVENTION

Figure 1:
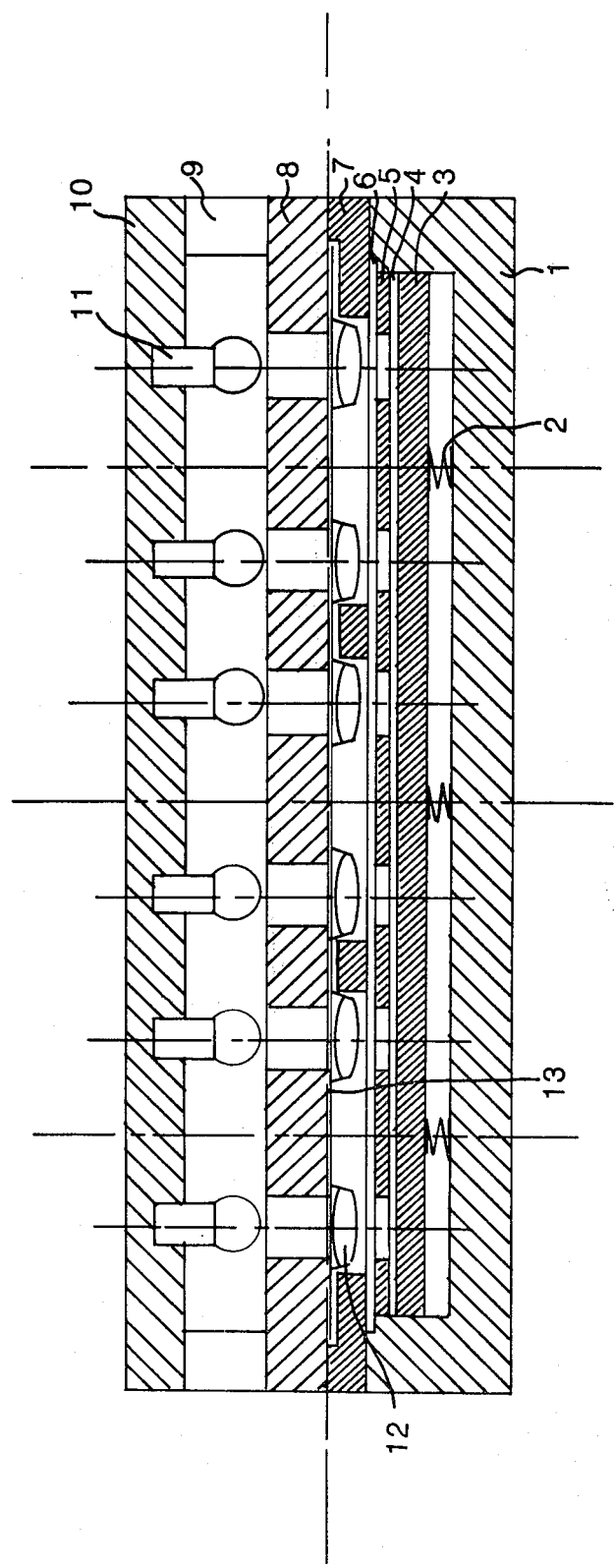
FIG. 1 is a section through an apparatus in accordance with the invention consisting in this case of a bank of solar cells.

In FIG. 1, a plurality of solar cells 4 are disposed in one plane on a carrier plate 3. Each individual solar cell occupies at least the area occupied by the corresponding aperture in the aperture mask 5. Each aperture in the aperture mask 5 has a diameter which as a rule is smaller than the diameter of the object 12 to be inspected. In this case, the object 12 is a conventional tablet packaged in a thermoformed foil 13. The solar cells 4 are usually protected by a thin glass plate (not shown). On the latter, the preferably exchangeable aperture mask 5 is disposed, preferably surmounted by a glass plate 6. Springs 2 resting on the lower part 1 of the apparatus force the entire assembly described so far into a fixed position against a guide or mount 7. In the embodiment illustrated, a light source 11 is disposed above each object. The light sources 11 are held by a carrier 10 which is supported through a spacer 9 on a radiation shield 8. The latter allows the light emitted by the light source 11 to pass to the object 12 to be inspected only over the area of said object. The radiation shield 8 thus shields the object 12 laterally from stray light or stray radiation.

The radiation shield 8 will not be needed if, in place of a diffuse light source, a focused beam adapted to the number and contours of the objects 12 to be inspected is used. This can be done simply by replacing the diffuse light sources 11 above the objects 12 with fiber-optic bundles, for example.

In place of a light or cold-light source, a source of infrared radiation may be used since solar cells respond also to this type of radiation.

Figure 2:
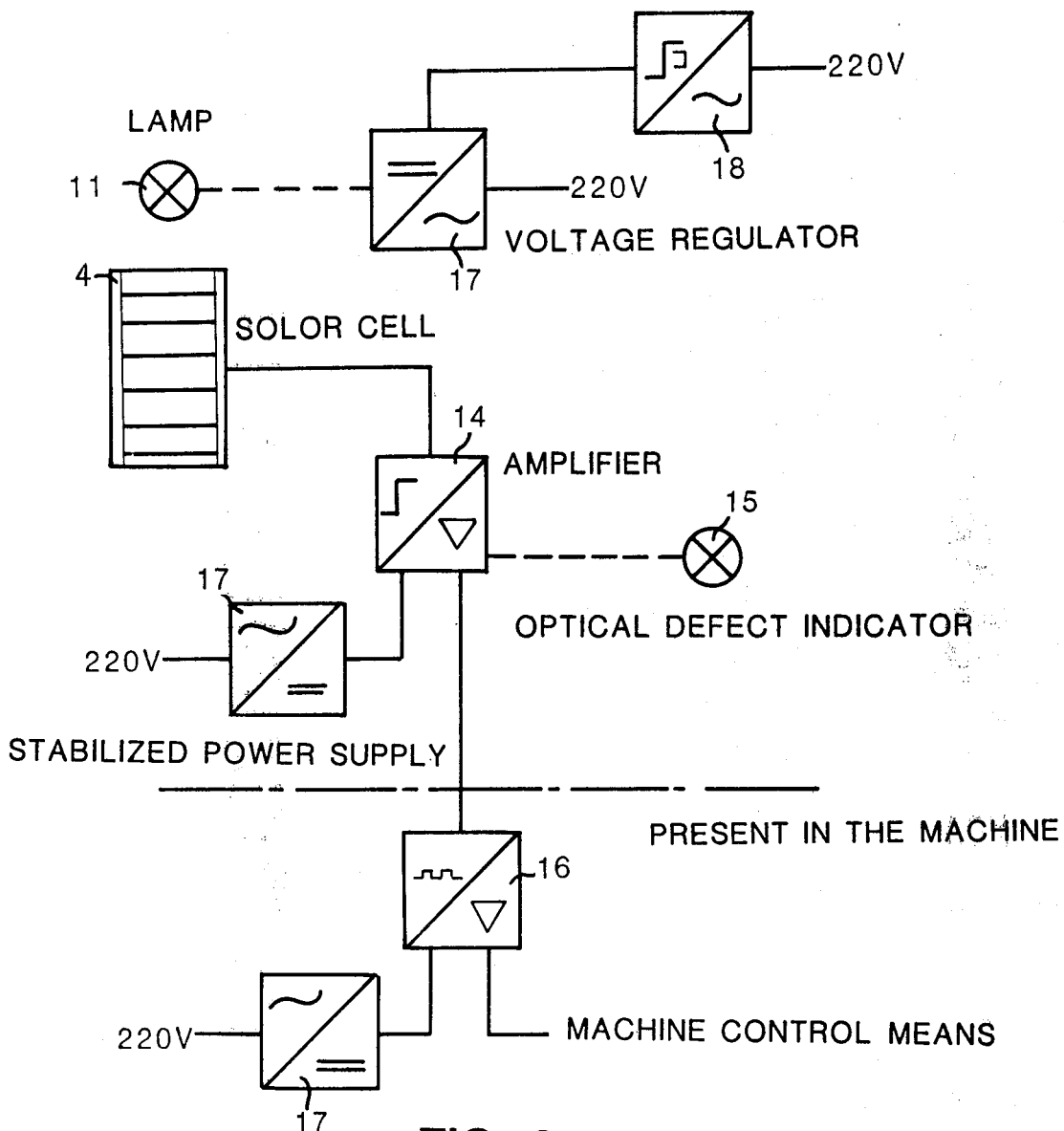
FIG. 2 is a block diagram showing how the signal produced in the apparatus is processed and indicated.

When light or radiation from the radiation source 11 falls on the object 12, which has been conveyed to the inspection site by a feeding means which is not shown, and the contours, shape and structure of the object are such that it completely covers the associated aperture in the aperture mask 5 and allows no radiation to pass, then practically no light or radiation will impinge on the solar cell 4 disposed beneath the aperture mask 5, and the amplifier, designated 14 in FIG. 2, will receive no voltage signal from the solar cell. This means that the inspected object is free of defects and is not eliminated.

However, when the contours of the object are flawed, light will fall past the location of the defect on the object 12 onto the large-area solar cell 4, and the amplifier 14 in FIG. 2 will then receive a voltage signal from the solar cell. The latter will respond also when the contours of the object are not flawed but its shape and structure are so faulty that a portion of the emitted radiation reaches the solar cell through the object. This will be the case, for example, when a tablet on the aperture mask 5 exhibits the required contours but not the required thickness.

When the amplifier 14 in FIG. 2 receives a voltage signal from one of the solar cells 4, it transmits a control signal to a defect-indicating means 15, and the object is then reported defective. The amplifier simultaneously delivers a signal to a further control circuit 16, which then actuates the production or packaging machine in such a way that the defective object is eliminated. The amplifier 14, the machine-control means 16 and the light sources 11 are supplied with current through stabilized power supplies 17 and current relay 18.

The amplifier 14 which processes the signal from the solar cell may operate as a differential amplifier and Schmitt trigger.

The light source 11 may be an incandescent lamp, an infrared-emitting diode or some other suitable light source. Incandescent lamps and light-emitting diodes (LED's) are referred to as diffuse radiators. When such diffuse radiators are used as light sources, it is advisable to provide a radiation shield 8 above the objects to be inspected. This shield can be dispensed with when focused light or optical fibers are used. Using the latter as radiation sources has the advantage that they can readily be adapted to the contours and number of the objects to be inspected in a solar-cell bank.

The inspection apparatus in accordance with the invention can readily be changed over to inspection of differently shaped objects, simply by exchanging the aperture mask 5 and possibly the radiation shield 8.

When the apparatus in accordance with the invention is used to inspect tablets packaged in thermoformed foils, for example, the apertures in the aperture mask 5 above the solar cells correspond exactly to the shape of the tablets to be inspected, and under each aperture in the mask, in other words, under each tablet, a solar cell which preferably fully covers the entire aperture is disposed. When, for example, 12-packs, that is to say, foils with 12 tablets in which three rows of four tablets each are combined in one package, are to be inspected, the aperture mask 5 will correspond to this 12-pack, in other words, it will be provided with three rows of four apertures of the size of a tablet. In that case, 12 solar cells are preferably disposed beneath the apertures in the aperture mask. If capsules are subsequently to be inspected with this apparatus, the tablet aperture mask is simply replaced with a capsule aperture mask and the machine is restarted. The changeover to inspection of suppositories, dragees, etc., is just as simple. If only missing objects are to be detected, scanning by means of solar cells and simple incandescent lamps is extremely economical. However, if high resolution is required, only a few objects are associated with a given solar cell, and a separate amplifier is assigned to each solar cell. It then becomes possible in the case of tablets with low permeability to light, for example, to eliminate those which are chipped, or exhibit spalling, in the horizontal plane. Limited thickness measurement is also possible. In that case, infrared-emitting diodes are preferably used as light sources.

Since the area under the object to be inspected is covered in its entirety, only one signal (a voltage signal) per object is needed for complete inspection. In contrast thereto, with the known optoelectric inspection apparatuses utilizing point-type scanning of the object even a small-size object requires the processing of hundreds and even thousands of signals, which calls for correspondingly complex and costly electronics. The apparatus in accordance with the invention thus is considerably simpler, cheaper and more reliable than prior-art inspection equipment. Moreover, it requires no lenses and can be built to have a very small overall height.

It will be apreciated that the instant specification and claims are set forth by way of illustration and not of limitation, and that various changes and modifications may be made without departing from the spirit and scope of the present invention.

What is claimed is:

1. In an apparatus for the optical scanning of objects in which the light from at least one light source may fall on at least one light-sensitive sensor and the objects to be scanned are disposed between the light source and the sensor, the improvement comprising an aperture mask having an aperture for each object to be scanned conforming to the contours the objects should have and disposed between the sensor and the objects to be scanned, the sensor comprising at least one large-area solar cell having an area at least as large as one of the apertures.

2. The apparatus according to claim 1, wherein the light source comprises a diffuse radiator and a radiation shield conforming to the objects to be scanned and disposed between the objects and the radiator.

3. The apparatus according to claim 2, wherein the radiator is one of a light-emitting diode and infrared light source.

4. The apparatus according to claim 1, wherein the light source comprises means for producing a focused beam for each object to be scanned corresponding to the contours of the object.

5. The apparatus according to claim 4, wherein the means comprises at least one fiber-optic bundle.

6. The apparatus according to claim 1, further comprising means for increasing the resolution of the apparatus at least in a predetermined area including a solar cell associated with each aperture in the predetermined area at least as large as the associated aperture and a separate amplifier for each solar cell.

7. The apparatus according to claim 1, further comprising a plurality of solar cells, a carrier plate supporting the solar cells, a glass plate fixed above the cells and springs biasing the carrier plate and cells against the glass plate.

8. The apparatus according to claim 1, further comprising a solar cell for each aperture of the mask.

9. The apparatus according to claim 1, further comprising an amplifier receptive of the output of the solar cell, defect-indicating means receptive of the output of the amplifier to produce a signal when a defect is sensed and machine-control means receptive of the output of the indicating means to effect disposal of a defective object.

* * * * *